(12) United States Patent
Henderson et al.

(10) Patent No.: US 10,421,147 B2
(45) Date of Patent: Sep. 24, 2019

(54) FIXTURE AND METHOD FOR RESISTANCE WELDING OF A PAD TO A SURFACE

(71) Applicant: GENERAL ELECTRIC COMPANY, Schenectady, NY (US)

(72) Inventors: Brian Leslie Henderson, Simpsonville, SC (US); Daniel James Dorriety, Travelers Rest, SC (US); Alioune Dieng, Greenville, SC (US); Lawrence J. Whims, Easley, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 981 days.

(21) Appl. No.: 14/943,558

(22) Filed: Nov. 17, 2015

(65) Prior Publication Data
US 2017/0136569 A1  May 18, 2017

(51) Int. Cl.
*B23K 11/11* (2006.01)
*B23Q 3/06* (2006.01)
(Continued)

(52) U.S. Cl.
CPC .......... *B23K 11/11* (2013.01); *B23K 11/002* (2013.01); *B23K 11/004* (2013.01);
(Continued)

(58) Field of Classification Search
CPC ....... B23Q 3/063; B23K 11/11; B23K 11/115; B23K 11/002; B23K 11/004; B23K 37/0443; B23K 2101/001
See application file for complete search history.

(56) References Cited

U.S. PATENT DOCUMENTS

| 3,331,166 A | * | 7/1967 | Brenning | ................ B24B 41/06 269/152 |
| 5,097,109 A | * | 3/1992 | O'Brien | ............. B23K 11/3018 219/158 |

(Continued)

FOREIGN PATENT DOCUMENTS

| EP | 1 563 937 A2 | 8/2005 |
| EP | 1 867 436 A1 | 12/2007 |

OTHER PUBLICATIONS

Extended European Search Report and Opinion issued in connection with corresponding EP Application No. 16199126.0 dated Jul. 7, 2017.

*Primary Examiner* — Geoffrey S Evans
(74) *Attorney, Agent, or Firm* — McNees Wallace & Nurick LLC

(57) ABSTRACT

A fixture and method for resistance welding of at least one pad to at least one surface of an article is disclosed. The method includes mounting the article in the fixture, placing the at least one pad on the at least one surface of the article, positioning a first electrode of a resistance welding apparatus to the at least one pad and a second electrode of the resistance welding apparatus to the article, and applying pressure and electric current across the at least one pad and the at least one surface. The fixture includes a first, second and third support element, which, respectively, include a first, second and third contact surface being adapted and disposed to support a first, second and third portion of the article. The first, second and third contact surfaces are each inelastic and electrically insulating. The fixture is arranged and disposed to non-rotatably cradle the article.

20 Claims, 2 Drawing Sheets

(51) Int. Cl.
*B23K 37/04* (2006.01)
*B23K 11/00* (2006.01)
*B23K 101/00* (2006.01)

(52) U.S. Cl.
CPC ........ *B23K 11/115* (2013.01); *B23K 37/0443* (2013.01); *B23Q 3/063* (2013.01); *B23K 2101/001* (2018.08)

(56) References Cited

U.S. PATENT DOCUMENTS

| | | | | |
|---|---|---|---|---|
| 5,289,897 | A | 3/1994 | Wiehe, Jr. | |
| 6,164,916 | A * | 12/2000 | Frost | B23K 35/3046 148/528 |
| 6,186,867 | B1 * | 2/2001 | Dwyer | B23Q 3/063 269/296 |
| 6,287,182 | B1 * | 9/2001 | Dwyer | B23Q 3/063 269/296 |
| 7,762,004 | B2 * | 7/2010 | Sherlock | F01D 25/285 33/562 |
| 8,128,078 | B2 * | 3/2012 | Ochiai | B23H 9/10 269/287 |
| 2010/0037459 | A1 * | 2/2010 | Gaul | B21D 3/00 29/889.1 |
| 2014/0301122 | A1 * | 10/2014 | Artelsmair | B23K 11/241 363/127 |
| 2016/0146020 | A1 * | 5/2016 | Richter | C22C 19/058 416/229 A |

* cited by examiner

FIXTURE AND METHOD FOR RESISTANCE WELDING OF A PAD TO A SURFACE

FIELD OF THE INVENTION

The present invention is directed to a fixture and a method for resistance welding. More particularly, the present invention is directed to a fixture and a method for resistance welding of a pad to a surface.

BACKGROUND OF THE INVENTION

Certain gas turbine blades have shrouds at the outer extremity of the airfoil. The blade shrouds are typically designed with an interlocking feature, usually in the form of a notch, which allows each blade to be interlocked at its shroud with an adjacent neighbor blade when such blades are installed about the circumference of a turbine disk. This interlocking feature assists in preventing the airfoils from vibrating, thereby reducing the stresses imparted on the blades during operation.

Turbine blades are often made of nickel-based superalloys or other high temperature superalloys designed to retain high strength at high temperature. The material of the blade shrouds and the interlocking notch may lack sufficient hardness to withstand wear stresses and rubbing which occur during start-up and shut-down of a turbine engine, as the shrouded blades twist to an "interlocked" and "non-interlocked" position, respectively. Due to the relatively low Rockwell hardness of the typical materials of the blade shrouds and the interlocking notch, the interlocks may wear, resulting in gaps opening between the blade shrouds, thereby allowing the airfoils to twist and further deform, and even to possibly vibrate during operation which is highly undesirable as such imparts additional higher stresses on the blades which can quickly lead to blade breakage and consequent failure of the turbine.

BRIEF DESCRIPTION OF THE INVENTION

In an exemplary embodiment, a fixture for resistance welding of at least one contact pad to at least one intershroud contact surface of a shrouded turbine blade includes a first support element, a second support element and a third support element. The first support element includes a first contact surface, the first support element being adapted and disposed to support a shroud edge of the shrouded turbine blade, and the first contact surface being inelastic and electrically insulating. The second support element includes a second contact surface, the second support element being adapted and disposed to support a root of the shrouded turbine blade, and the second contact surface being inelastic and electrically insulating. The third support element includes a third contact surface, the third support element being adapted and disposed to support an angel wing of the shrouded turbine blade, and the third contact surface being inelastic and electrically insulating. The fixture is arranged and disposed to non-rotatably cradle the shrouded turbine blade with the at least one intershroud contact surface accessible for placement of the at least one contact pad and application of a first electrode of a resistance welding apparatus to the at least one contact pad and a second electrode of the resistance welding apparatus to the shrouded turbine blade.

In another exemplary embodiment, a method for resistively welding at least one pad to at least one surface of an article includes mounting the article in a fixture, placing the at least one pad on the at least one surface of the article, positioning a first electrode of a resistance welding apparatus to the at least one pad and a second electrode of the resistance welding apparatus to the article, and applying pressure and electric current across the at least one pad and the at least one surface of the article. The fixture includes a first support element, a second support element, and a third support element. The first support element includes a first contact surface, the first support element being adapted and disposed to support a first portion of the article, and the first contact surface being inelastic and electrically insulating. The second support element includes a second contact surface, the second support element being adapted and disposed to support a second portion of the article, and the second contact surface being inelastic and electrically insulating. The third support element includes a third contact surface, the third support element being adapted and disposed to support a third portion of the article, and the third contact surface being inelastic and electrically insulating. The fixture is arranged and disposed to non-rotatably cradle the article.

In another exemplary embodiment, a method for resistively welding a first at least one contact pad to a first at least one intershroud contact surface of a shrouded turbine blade and a second at least one contact pad to a second at least one intershroud contact surface of the shrouded turbine blade includes mounting the shrouded turbine blade in a fixture, placing the first at least one contact pad on the first at least one intershroud contact surface, positioning a first electrode of a resistance welding apparatus to the first at least one contact pad and a second electrode of the resistance welding apparatus to the shrouded turbine blade, and applying pressure and electric current across the first at least one contact pad and the first at least one intershroud contact surface. The shrouded turbine blade is dismounted from the fixture, rotated, and remounted in the fixture. The second at least one contact pad is placed on the second at least one intershroud contact surface, the first electrode of the resistance welding apparatus is positioned to the second at least one contact pad and the second electrode of the resistance welding apparatus is positioned to the shrouded turbine blade, and pressure and electric current is applied across the second at least one contact pad and the second at least one intershroud contact surface. The fixture includes a first support element, a second support element and a third support element. The first support element includes a first contact surface, the first support element being adapted and disposed to support a shroud edge of the shrouded turbine blade, and the first contact surface being inelastic and electrically insulating. The second support element includes a second contact surface, the second support element being adapted and disposed to support a root of the shrouded turbine blade, and the second contact surface being inelastic and electrically insulating. The third support element includes a third contact surface, the third support element being adapted and disposed to support an angel wing of the shrouded turbine blade, and the third contact surface being inelastic and electrically insulating. The fixture is arranged and disposed to non-rotatably cradle the shrouded turbine blade.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary fixtures and a methods for resistance welding of a pad to a surface. Embodiments of the present disclosure, in comparison to methods not utilizing one or more features disclosed herein, increase efficiency, reduce costs, reduce process time, increase joint strength, or a combination thereof.

Figure 1:
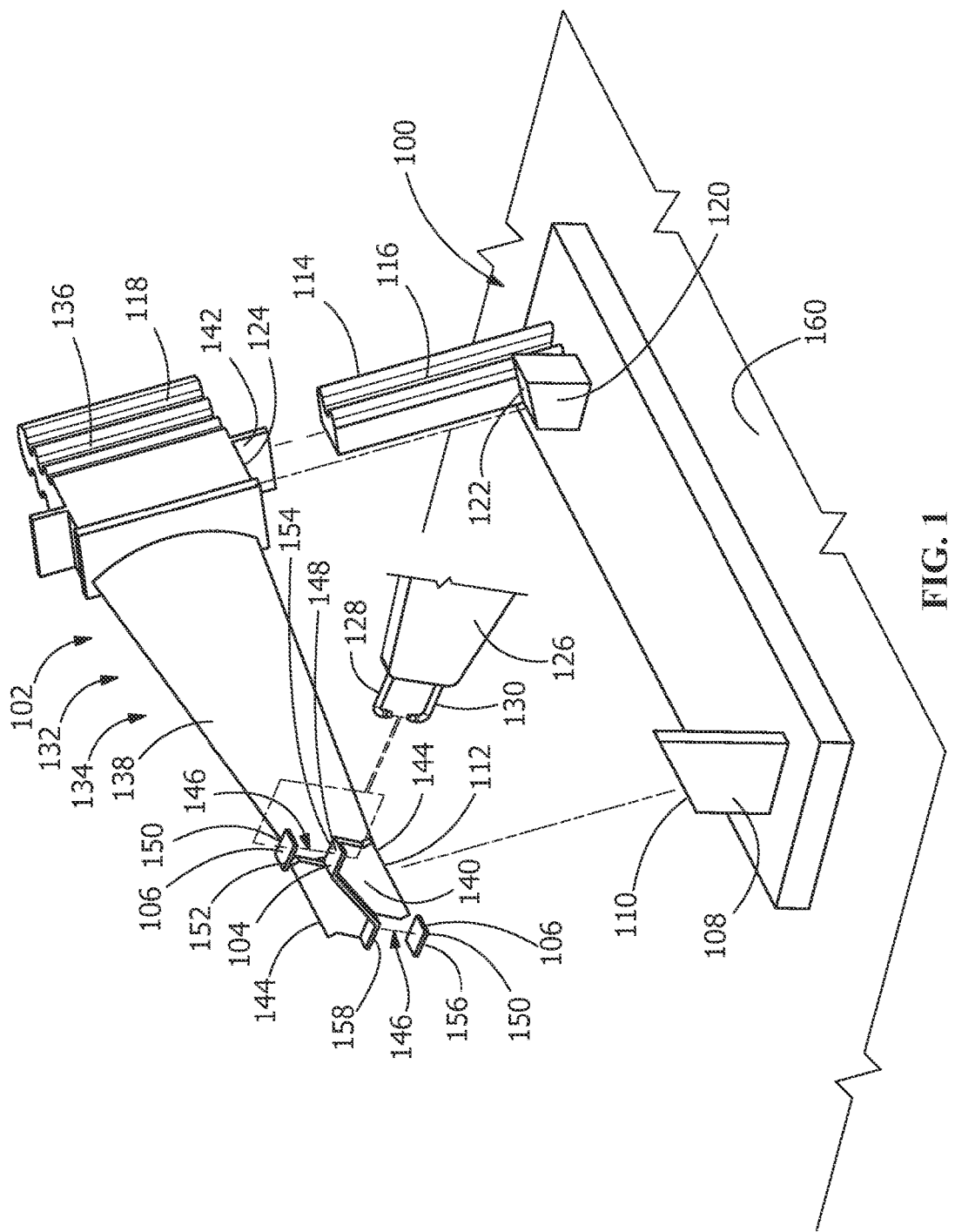
FIG. 1 is an exploded perspective view of a fixture with an article and resistance welding apparatus, according to an embodiment of the present disclosure.
Figure 2:
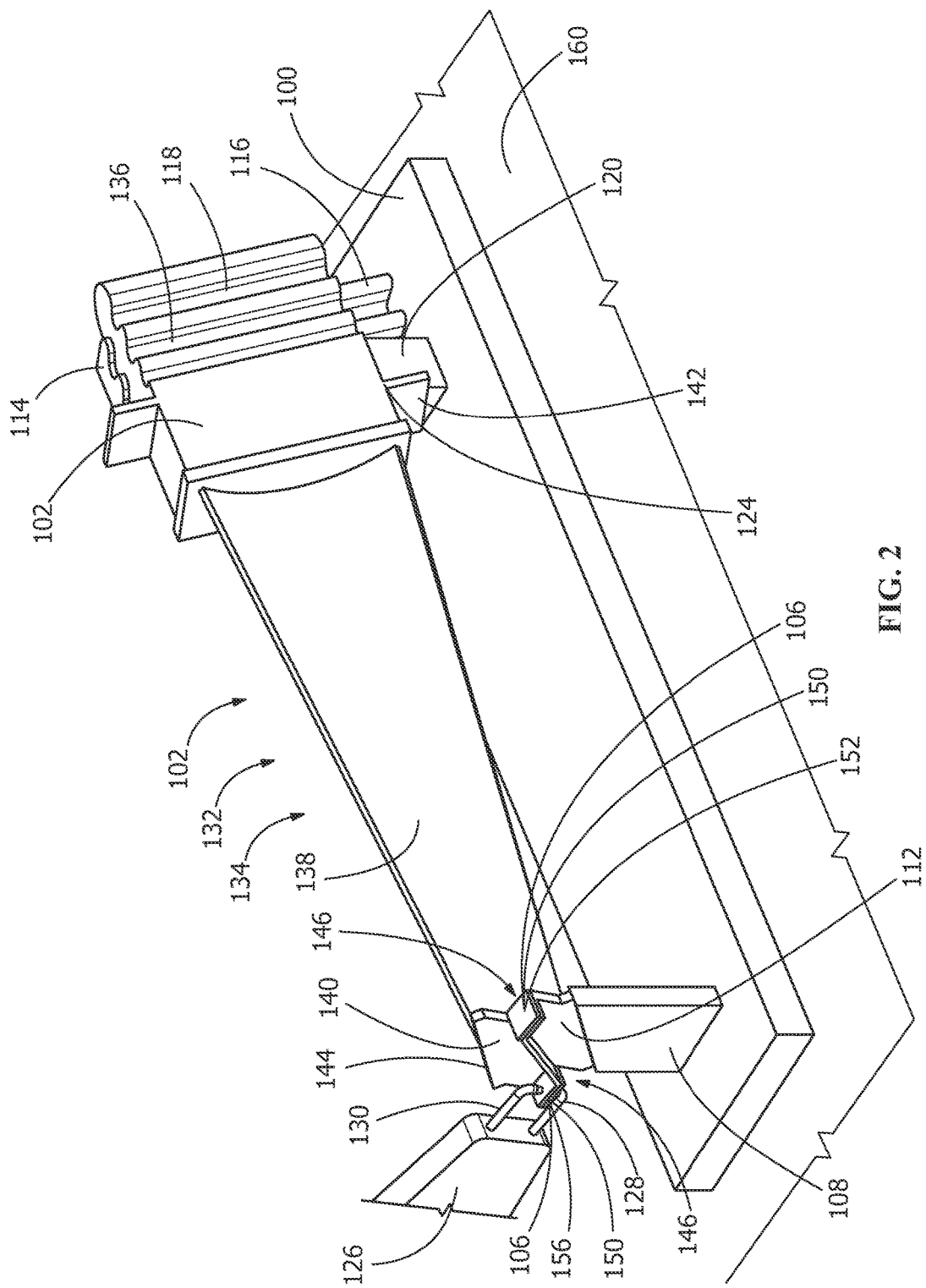
FIG. 2 is an assembled perspective view of the fixture, article and resistance welding apparatus of FIG. 1, according to an embodiment of the present disclosure.

Referring to FIGS. 1 and 2, in one embodiment, a fixture 100 for resistance welding of at least one pad 106 to at least one surface 104 of an article 102 includes a first support element 108, a second support element 114, and a third support element 120. The first support element 108 includes a first contact surface 110, the first support 108 element being adapted and disposed to support a first portion 112 of the article 102, and the first contact surface 110 being inelastic and electrically insulating. The second support element 114 includes a second contact surface 116, the second support element 114 being adapted and disposed to support a second portion 118 of the article 102, and the second contact surface 116 being inelastic and electrically insulating. The third support element 120 includes a third contact surface 122, the third support element 120 being adapted and disposed to support a third portion 124 of the article 102, and the third contact surface 122 being inelastic and electrically insulating. The fixture 100 is arranged and disposed to non-rotatably cradle the article 102 with at least one surface 104 of the article 102 accessible for placement of the at least one pad 106 on the at least one surface 104 and the application of a first electrode 128 of a resistance welding apparatus 126 to the at least one pad 106 and a second electrode 130 of the resistance welding apparatus 126 to the article 102.

As used herein, "inelastic" indicates a material which does not exhibit any significant elasticity under the temperature and pressure conditions necessary for resistively welding the at least one pad 106 to the at least one surface 104. As used herein, "non-rotatably cradle" indicates that the fixture 100 maintains the article 102 in place without significant translational or rotational movement under the physical conditions generated by the resistance welding apparatus 126 resistively welding the at least one pad 106 to the at least one surface 104.

In one embodiment, the article 102 is a turbine component 132. The turbine component 132 may be formed from any suitable material, including, but not limited to, superalloys, nickel-based superalloys, cobalt-based superalloys, or combinations thereof. In a further embodiment, the turbine component 132 is a shrouded turbine blade 134 including a root 136, an airfoil 138, a blade shroud 140, and an angel wing 142. The blade shroud 140 includes a shroud edge 144, and at least one interlocking notch 146 having at least one intershroud contact surface 148. The at least one intershroud contact surface 148 is the at least one surface 104. The first portion 112 of the article 102 is the shroud edge 144, the second portion 118 of the article 102 is the root 136, and the third portion 124 of the article 102 is the angel wing 142. The at least one pad 106 is at least one contact pad 150.

The at least one pad 106 may include any suitable material, including, but not limited to, CM64, PWA 694, MTS 1087A, B50TF193, B50TF193S6, T800, or combinations thereof. In one embodiment, the at least one pad 106 includes a material having a diamond pyramid hardness of at least about 175 at 1,400° F. The at least one pad 106 may be free of low melt alloys and binding agents. As used herein, "free of low melt alloys and binding agents" indicates that any low melt alloy or binding agent present, cumulatively, is beneath the threshold which would materially affect the physical properties of the at least one pad 106. In another embodiment, the at least one pad 106 is more resistive to abrasion than the at least one surface 104 of the article 102. In yet another embodiment, the at least one pad 106 includes a thickness between about 0.005 inches and about 0.400 inches, alternatively between about 0.01 inches and about 0.35 inches, alternatively about 0.05 inches to about 0.30 inches, alternatively between about 0.10 inches to about 0.25 inches.

The fixture 100 may be configurable for resistance welding of a first at least one pad 152 to a first surface 154 of the article 102 and a second at least one pad 156 to a second at least one surface 158 of the article 102.

In one embodiment, the fixture 100 is arranged and disposed to position the article 102 with at least three distinct welding positions accessible on the at least one pad 106.

The fixture 100 may include at least one point of contact with a supporting surface 160. The fixture 100 may further include at least four points of contact with the supporting surface 160.

In one embodiment, a method for resistively welding at least one pad 106 to at least one surface 104 of an article 102 includes mounting the article 102 in the fixture 100, placing the at least one pad 106 on the at least one surface 104 of the article 102, positioning a first electrode 128 of a resistance welding apparatus 126 to the at least one pad 106 and a second electrode 130 of the resistance welding apparatus 126 to the article 102, and applying pressure and electric current across the at least one pad 106 and the at least one surface 104 of the article 102. Resistively welding the at least one pad 106 to the at least one surface 104 may include resistively welding the at least one pad 106 to the at least one surface 104 in at least three distinct locations.

In a further embodiment, mounting the article 102 in the fixture 100 includes mounting a shrouded turbine blade 134 in the fixture 100. Placing the at least one pad 106 on the at least one surface 104 of the article 102 may include placing the at least one pad 106 on at least one intershroud contact surface 148 of the shrouded turbine blade 134. Mounting the article 102 in the fixture 100 may further include disposing a shroud edge 144 of the shrouded turbine blade 134 on the first contact surface 110 of the first support element 108, disposing a root 136 of the shrouded turbine blade 134 on the second contact surface 116 of the second support element 114, and disposing an angel wing 142 of the shrouded turbine blade 134 on the third contact surface 122 of the third support element 120.

In another embodiment, a method for resistively welding a first at least one pad 152 to a first at least one surface 154 of an article 102 and a second at least one pad 156 to a second at least one surface 158 of the article 102 includes mounting the article 102 in the fixture 100, placing the first at least one pad 152 on the first at least one surface 154, positioning a first electrode 128 of a resistance welding apparatus 126 to the first at least one pad 152 and a second electrode 130 of the resistance welding apparatus 126 to the article 102, applying pressure and electric current across the first at least one pad 152 and the first at least one surface 154, dismounting the article 102 from the fixture 100, rotating the article 102, remounting the article 102 in the fixture 100, placing the second at least one pad 156 on the second at least one surface 158, positioning the first electrode 128 of the resistance welding apparatus 126 to the second at least one pad 156 and the second electrode 130 of the resistance welding apparatus 126 to the article 102, and applying pressure and electric current across the second at least one pad 156 and the second at least one surface 158. Resistively welding the first at least one pad 152 to the first at least one surface 154 may include resistively welding the first at least one pad 152 to the first at least one surface 154 in at least three distinct locations. Resistively welding the second at least one pad 156 to the second at least one surface 158 may include resistively welding the second at least one pad 156 to the second at least one surface 158 in at least three distinct locations. The identification of the first at least one pad 152 and the first at least one surface 154, and the second at least one pad 156 and the second at least one surface 158, in FIGS. 1 and 2 are for illustrative purposes only, and are considered to be interchangeable.

The fixture 100 may be reconfigured from a first contract surface configuration to a second contact surface configuration to non-rotatably cradle the article 102 with the first at least one surface 154 accessible for placement of the first at least one pad 152 on the first at least one surface 154 and the application of the first electrode 128 to the first at least one pad 152 and the second electrode 130 to the article 102 prior to rotating the article 102, and to non-rotatably cradle the article 102 with the second at least one surface 158 accessible for placement of the second at least one pad 156 on the second at least one surface 158 and the application of the first electrode 128 to the second at least one pad 156 and the second electrode 130 to the article 102 after rotating the article 102.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fixture for resistance welding of at least one contact pad to at least one intershroud contact surface of a shrouded turbine blade, the fixture comprising:
   a first support having a first contact surface, the first support being adapted and disposed to support a shroud edge of the shrouded turbine blade, and the first contact surface being inelastic and electrically insulating;
   a second support having a second contact surface, the second support being adapted and disposed to support a root of the shrouded turbine blade, and the second contact surface being inelastic and electrically insulating; and
   a third support having a third contact surface, the third support being adapted and disposed to directly support an angel wing of the shrouded turbine blade, and the third contact surface being inelastic and electrically insulating;
   wherein the first support, the second support, and the third support are arranged and disposed to non-rotatably cradle the shrouded turbine blade with the at least one intershroud contact surface accessible for placement of the at least one contact pad and application of a first electrode of a resistance welding apparatus to the at least one contact pad and a second electrode of the resistance welding apparatus to the shrouded turbine blade.

2. The fixture of claim 1, further being configurable for resistance welding of a first at least one contact pad to a first at least one intershroud contact surface of the shrouded turbine blade and a second at least one contact pad to a second at least one intershroud contact surface of the shrouded turbine blade.

3. The fixture of claim 1, further being arranged and disposed to position the shrouded turbine blade with at least three distinct welding positions accessible on the at least one contact pad.

4. The fixture of claim 1, further including at least one point of contact with a supporting surface.

5. The fixture of claim 4, further including at least four points of contact with the supporting surface.

6. A method for resistively welding at least one pad to at least one surface of an article, comprising:
   mounting the article in a fixture, the fixture including:
      a first support having a first contact surface, the first support being adapted and disposed to support a first portion of the article, and the first contact surface being inelastic and electrically insulating;
      a second support having a second contact surface, the second support being adapted and disposed to support a second portion of the article, and the second contact surface being inelastic and electrically insulating; and
      a third support having a third contact surface, the third support being adapted and disposed to directly support a third portion of the article, and the third contact surface being inelastic and electrically insulating,
      wherein the fixture is arranged and disposed to non-rotatably cradle the article;
   placing the at least one pad on the at least one surface of the article;
   positioning a first electrode of a resistance welding apparatus to the at least one pad and a second electrode of the resistance welding apparatus to the article; and
   applying pressure and electric current across the at least one pad and the at least one surface of the article,
   wherein mounting the article in the fixture includes mounting a shrouded turbine blade in the fixture, and
   wherein mounting the article in the fixture includes disposing a shroud edge of the shrouded turbine blade on the first contact surface of the first support, disposing a root of the shrouded turbine blade on the second contact surface of the second support, and disposing an angel wing of the shrouded turbine blade on the third contact surface of the third support.

7. The method of claim 6, wherein placing the at least one pad on the at least one surface of the article includes placing the at least one pad on at least one intershroud contact surface of the shrouded turbine blade.

8. A method for resistively welding at least one pad to at least one surface of an article, comprising:
   mounting the article in a fixture, the fixture including:
      a first support having a first contact surface, the first support being adapted and disposed to support a first portion of the article, and the first contact surface being inelastic and electrically insulating;

a second support having a second contact surface, the second support being adapted and disposed to support a second portion of the article, and the second contact surface being inelastic and electrically insulating; and a third support having a third contact surface, the third support being adapted and disposed to support a third portion of the article, and the third contact surface being inelastic and electrically insulating;

wherein the fixture is arranged and disposed to non-rotatably cradle the article;

placing the at least one pad on the at least one surface of the article;

positioning a first electrode of a resistance welding apparatus to the at least one pad and a second electrode of the resistance welding apparatus to the article; and applying pressure and electric current across the at least one pad and the at least one surface of the article, wherein placing the at least one pad on the at least one surface of the article includes placing at least one contact pad free of low melt alloys and binding agents on the at least one surface of the article, the at least one contact pad being more resistive to abrasion than the at least one surface of the article.

9. The method of claim 8, wherein mounting the article in the fixture includes mounting a shrouded turbine blade in the fixture.

10. The method of claim 9, wherein mounting the article in the fixture includes disposing a shroud edge of the shrouded turbine blade on the first contact surface of the first support, disposing a root of the shrouded turbine blade on the second contact surface of the second support, and disposing an angel wing of the shrouded turbine blade on the third contact surface of the third support.

11. A method for resistively welding a first at least one contact pad to a first at least one intershroud contact surface of a shrouded turbine blade and a second at least one contact pad to a second at least one intershroud contact surface of the shrouded turbine blade, comprising:

mounting the shrouded turbine blade in a fixture, the fixture including:

a first support having a first contact surface, the first support being adapted and disposed to support a shroud edge of the shrouded turbine blade, and the first contact surface being inelastic and electrically insulating;

a second support having a second contact surface, the second support being adapted and disposed to support a root of the shrouded turbine blade, and the second contact surface being inelastic and electrically insulating; and a third support having a third contact surface, the third support being adapted and disposed to support an angel wing of the shrouded turbine blade, and the third contact surface being inelastic and electrically insulating;

wherein the fixture is arranged and disposed to non-rotatably cradle the shrouded turbine blade;

placing the first at least one contact pad on the first at least one intershroud contact surface;

positioning a first electrode of a resistance welding apparatus to the first at least one contact pad and a second electrode of the resistance welding apparatus to the shrouded turbine blade;

applying pressure and electric current across the first at least one contact pad and the first at least one intershroud contact surface;

dismounting the shrouded turbine blade from the fixture;

rotating the shrouded turbine blade;

remounting the shrouded turbine blade in the fixture;

placing the second at least one contact pad on the second at least one intershroud contact surface;

positioning the first electrode of the resistance welding apparatus to the second at least one contact pad and the second electrode of the resistance welding apparatus to the shrouded turbine blade; and applying pressure and electric current across the second at least one contact pad and the second at least one intershroud contact surface.

12. The method of claim 11, further including reconfiguring the fixture from a first contract surface configuration to a second contact surface configuration.

13. The method of claim 11, further including resistively welding the first at least one contact pad to the first at least one intershroud contact surface in at least three distinct locations.

14. The method of claim 11, further including resistively welding the second at least one contact pad to the second at least one intershroud contact surface in at least three distinct locations.

15. The method of claim 11, wherein the first at least one contact pad is free of low melt alloys and binding agents.

16. The method of claim 11, wherein the second at least one contact pad is free of low melt alloys and binding agents.

17. The method of claim 11, wherein the first at least one contact pad is more resistive to abrasion than the first at least one intershroud contact surface.

18. The method of claim 11, wherein the second at least one contact pad is more resistive to abrasion than the second at least one intershroud contact surface.

19. The method of claim 11, wherein the first at least one contact pad includes a thickness between about 0.005 inches and about 0.400 inches.

20. The method of claim 11, wherein the second at least one contact pad includes a thickness between about 0.005 inches and about 0.400 inches.

* * * * *